Dec. 4, 1956   J. A. KELLAM   2,772,766
ARTICLE INVERTING APPARATUS
Filed Feb. 17, 1954   6 Sheets-Sheet 1
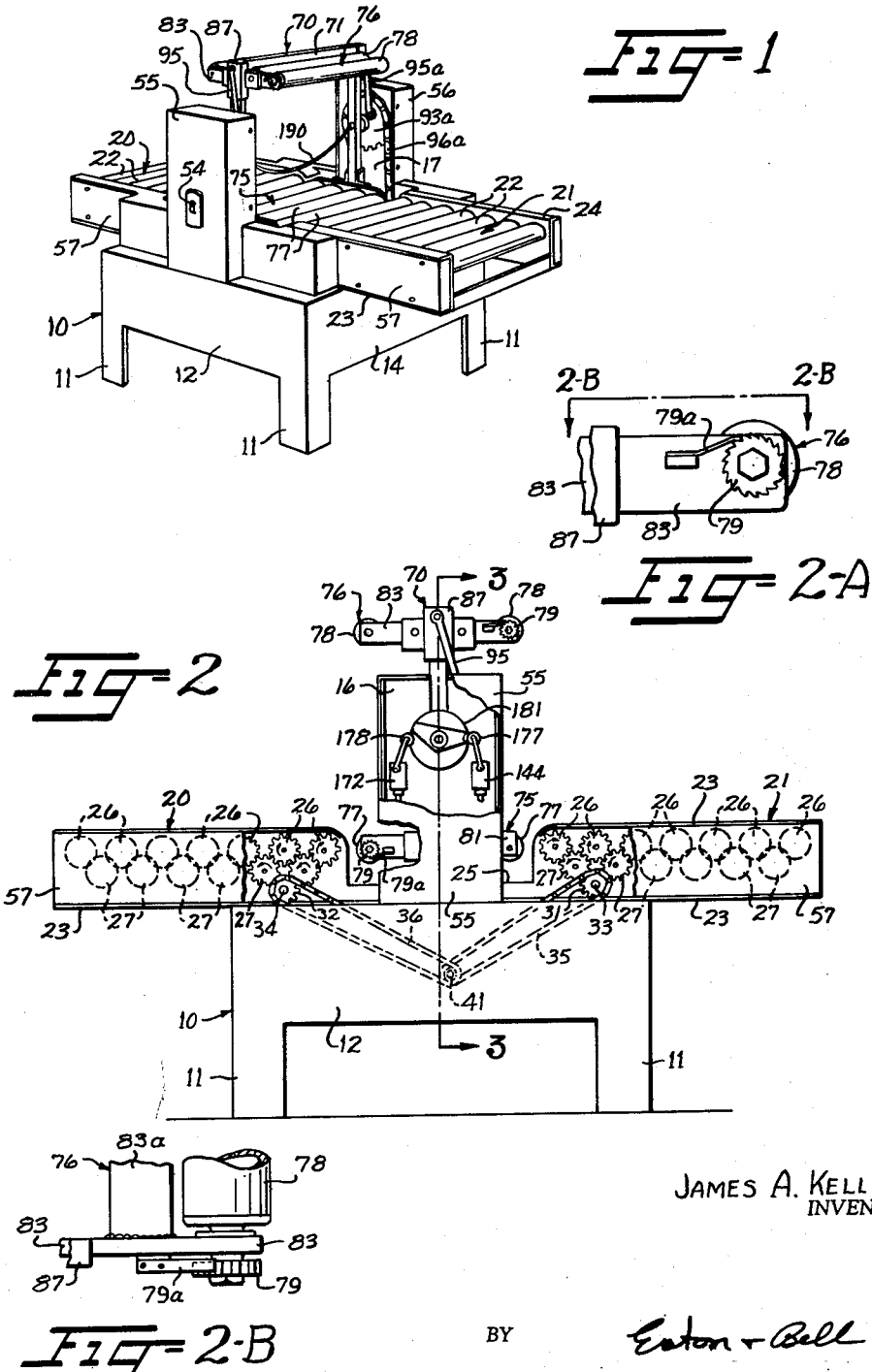
JAMES A. KELLAM,
INVENTOR.
BY Eaton + Bell
ATTORNEYS.

Dec. 4, 1956 J. A. KELLAM 2,772,766
ARTICLE INVERTING APPARATUS
Filed Feb. 17, 1954 6 Sheets-Sheet 2
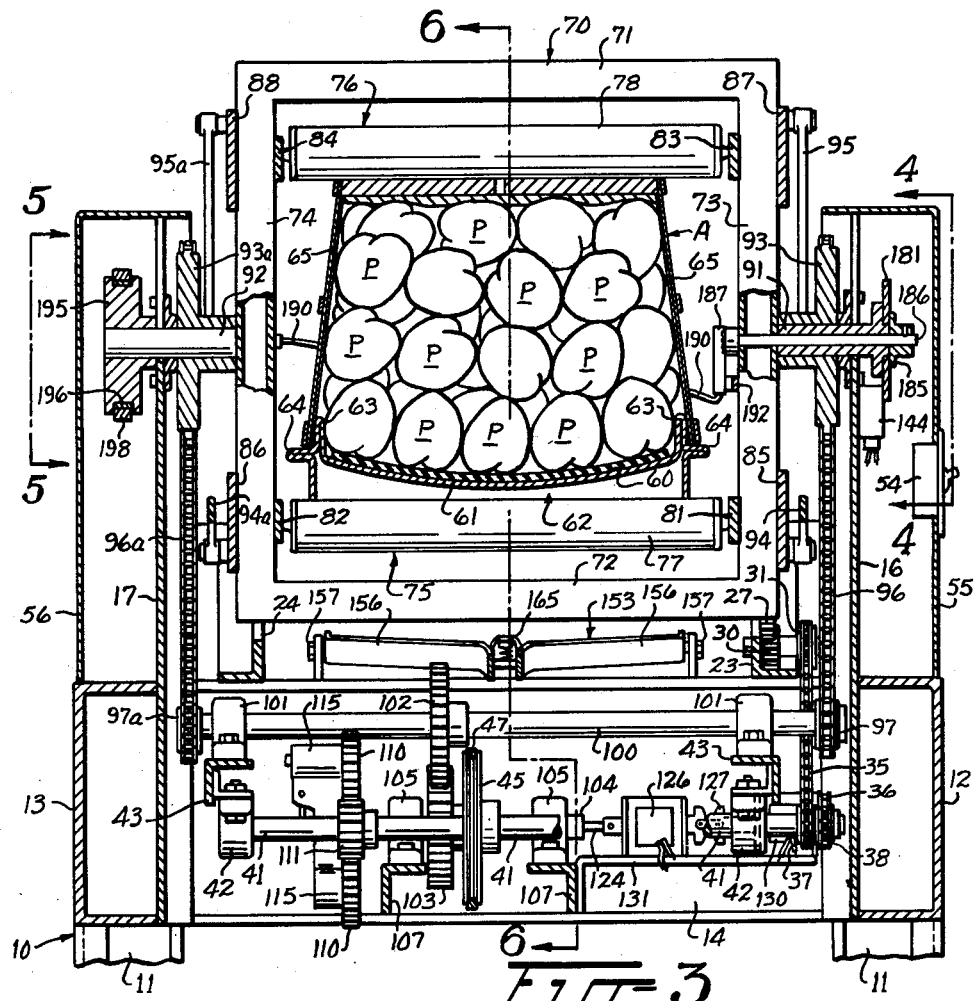
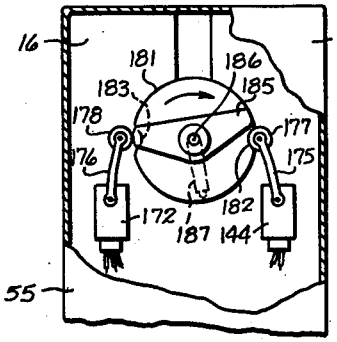
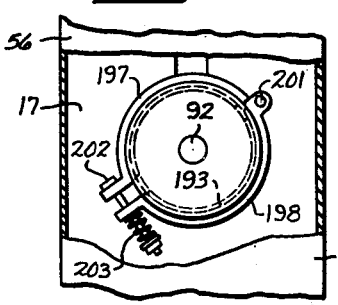
INVENTOR:
JAMES A. KELLAM.
BY Eaton + Bell
ATTORNEYS.

Dec. 4, 1956 J. A. KELLAM 2,772,766
ARTICLE INVERTING APPARATUS
Filed Feb. 17, 1954 6 Sheets-Sheet 3
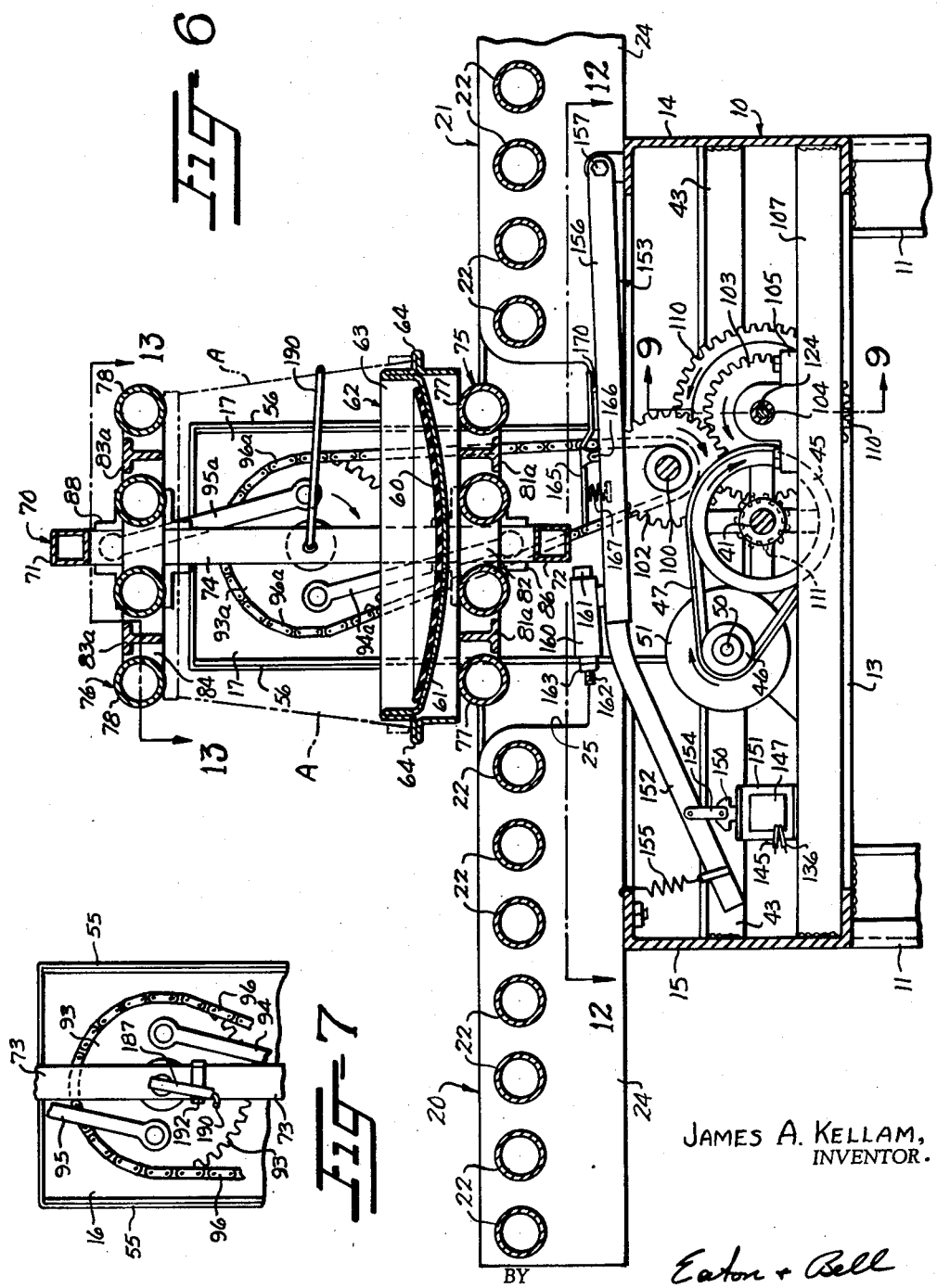
James A. Kellam,
INVENTOR.
Eaton + Bell
ATTORNEYS.

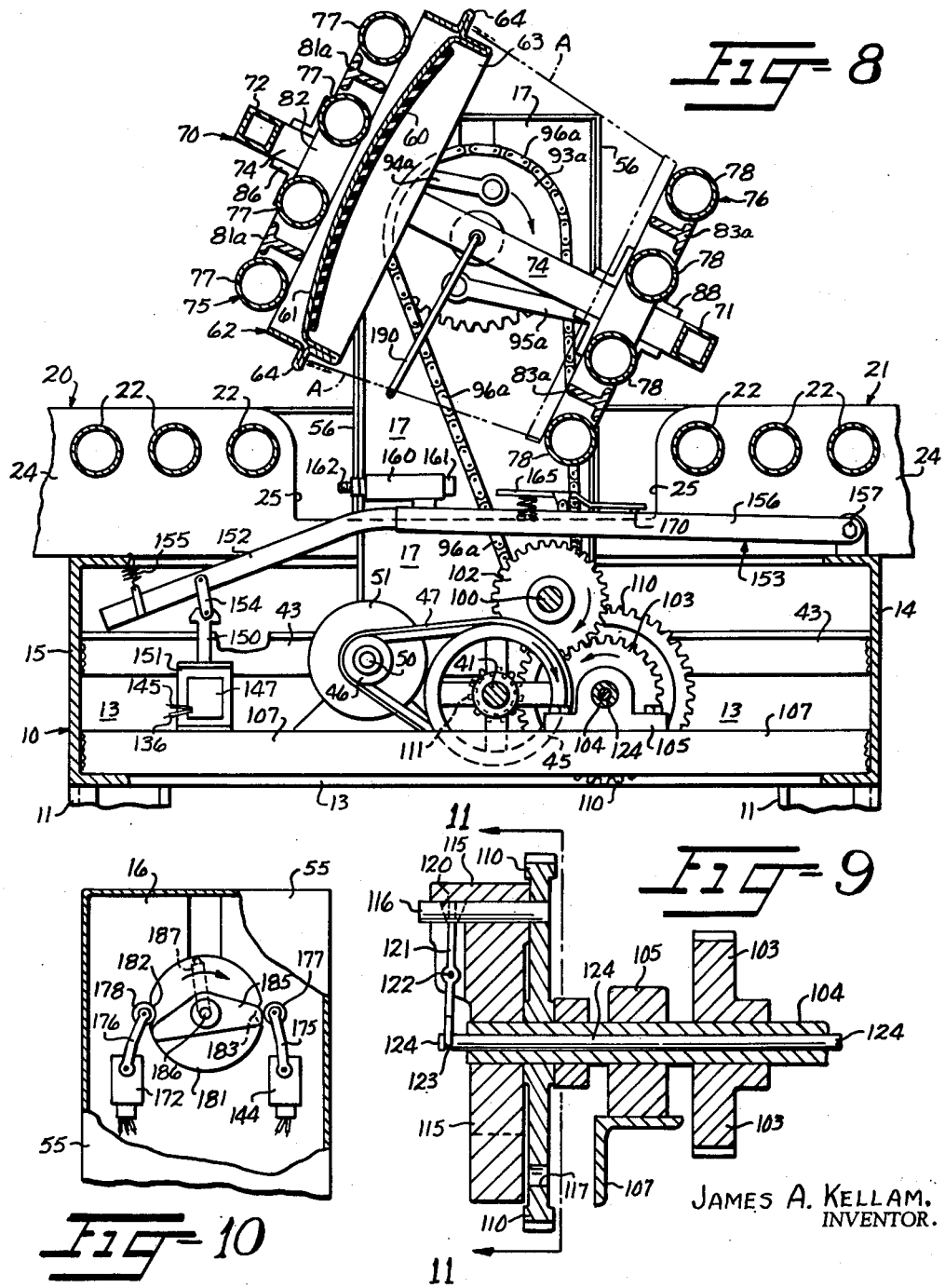

James A. Kellam,
INVENTOR.

BY Eaton + Bell
ATTORNEYS.

Dec. 4, 1956     J. A. KELLAM     2,772,766
ARTICLE INVERTING APPARATUS
Filed Feb. 17, 1954     6 Sheets-Sheet 6
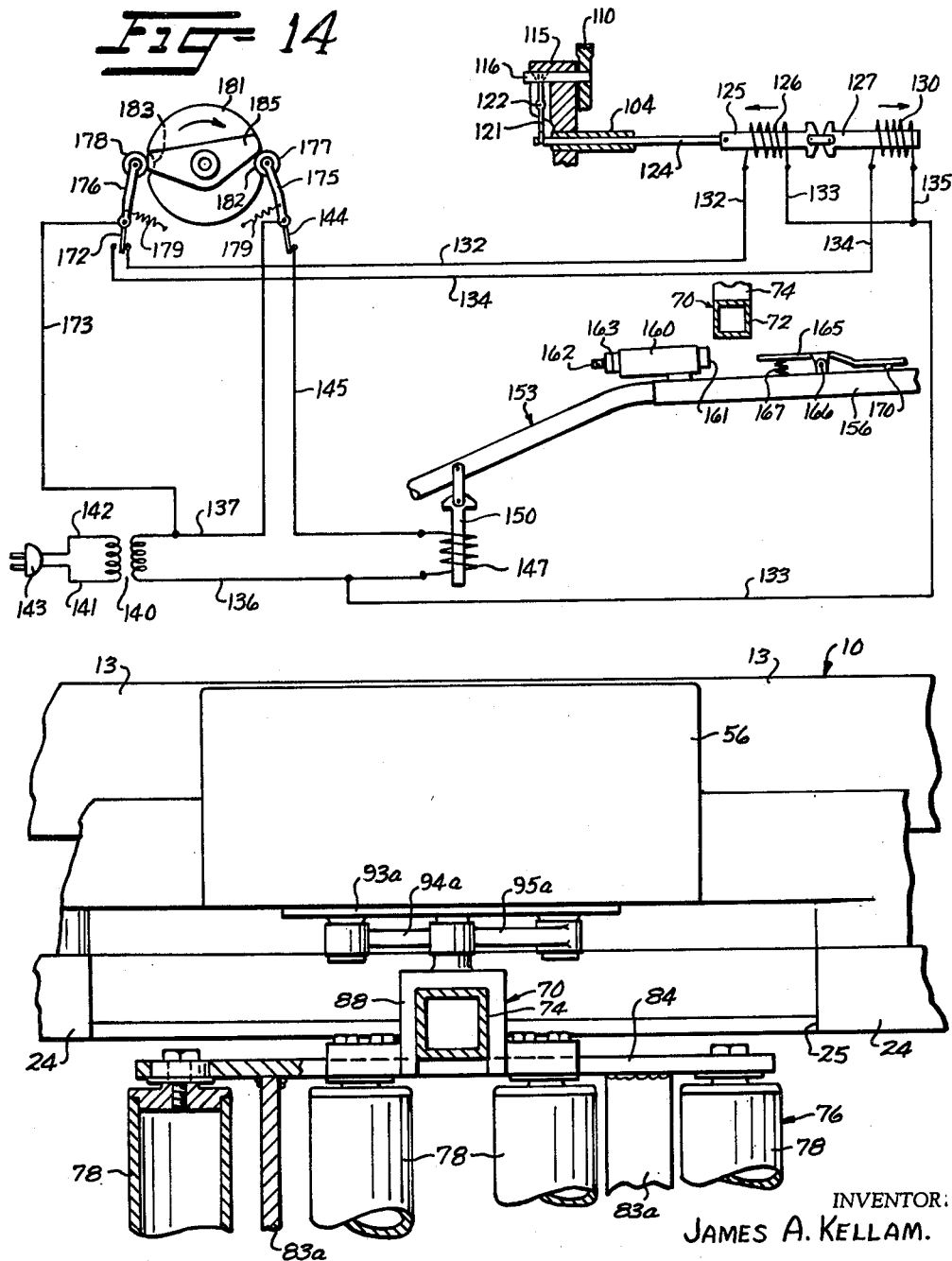
INVENTOR:
JAMES A. KELLAM.
BY Eaton & Bell
ATTORNEYS.

# United States Patent Office 2,772,766
Patented Dec. 4, 1956

2,772,766
ARTICLE INVERTING APPARATUS
James A. Kellam, Biscoe, N. C.

Application February 17, 1954, Serial No. 410,855

14 Claims. (Cl. 198—33)

This invention relates to apparatus for inverting articles, and more especially, to an improved machine for turning or inverting fruit baskets and the like during a packing operation.

It is the primary object of this invention to provide an article inverting or turning apparatus comprising constantly driven conveyor means for receiving a row of said articles and feeding the articles, one at a time, onto the lowermost of a pair of vertically spaced gripping platforms, preferably provided with rollers thereon, with means engageable by each successive article for actuating the gripping platforms to grip the article therebetween. The gripping platforms are mounted on a rotatable frame which is automatically rotated in response to the actuation of the gripping platforms in a gripping operation for imparting substantially one-half a revolution to the rotatable frame and the platforms and whereupon the gripping platforms then move apart from each other to release the article and wherein a conveyor means is also provided for directing the articles so inverted away from the vertically spaced platforms.

Briefly, the improved article inverting apparatus comprises longitudinally spaced driven ingress and egress conveyors between which a rotatable frame is disposed, the frame being provided with a pair of spaced gripping platforms, preferably provided with rollers thereon, and onto the lowermost of which each successive package is delivered by the ingress conveyor. A pliable element loosely spans the distance between the spaced side members of the rotatable frame and as each successive package is directed onto the lowermost gripping platform, the package engages and tightens the pliable element to actuate a clutch mechanism connected with the rotatable frame and to establish a fixed connection between the rotatable frame and a constantly driven element while also releasing the rotatable frame from a latching means which normally holds the rotatable frame in a substantially vertical position and against rotation at the point of loading and unloading of the frame.

The two gripping platforms are mounted for relative movement on the rotatable frame toward and away from each other and have the distal ends of respective links connected thereto whose proximal ends are connected to substantially diametrically opposed portions of a disk-like member (a sprocket wheel in this instance), which is loosely mounted on the journal end portions of the rotatable frame and which journal end portions or, at least, one journal end portion of which is frictionally restrained from rotative movement so the disk-like member will rotate a part of a revolution independently of the rotatable frame to thus cause the gripping platforms to move toward each other to clamp the article or package therebetween.

When the amount of torsional pressure exerted on the links connected between the disk-like member and the gripping platforms is sufficient to overcome the frictional resistance to rotative movement of the rotatable frame, continued rotative movement of the disk-like member will then impart corresponding rotative movement to the rotatable frame.

Upon rotation of the rotatable frame through approximately one-hundred eighty degrees, means are provided for automatically disengaging the clutch mechanism as the latching means is again made effective for restraining the rotatable frame from further rotation and, since the disk-like member is then free to rotate in either direction, the then lowermost platform moves downwardly under the weight of the article thereon and, through the medium of the disk-like member, imparts corresponding movement to the other of the platforms in the opposite direction thereby releasing the inverted article from the platforms and, whereupon, the inverted article is then moved off of the then lowermost platform by the next succeeding article moving in engagement therewith to complete a cycle in the operation of the machine.

Some of the objects of the invention having been stated, other objects will appear as the description proceeds, when taken in connection with the accompanying drawings, in which—

Figure 1 is a perspective view of the complete machine;

Figure 2 is an enlarged side elevation of the machine with some of the parts broken away;

Figure 12:
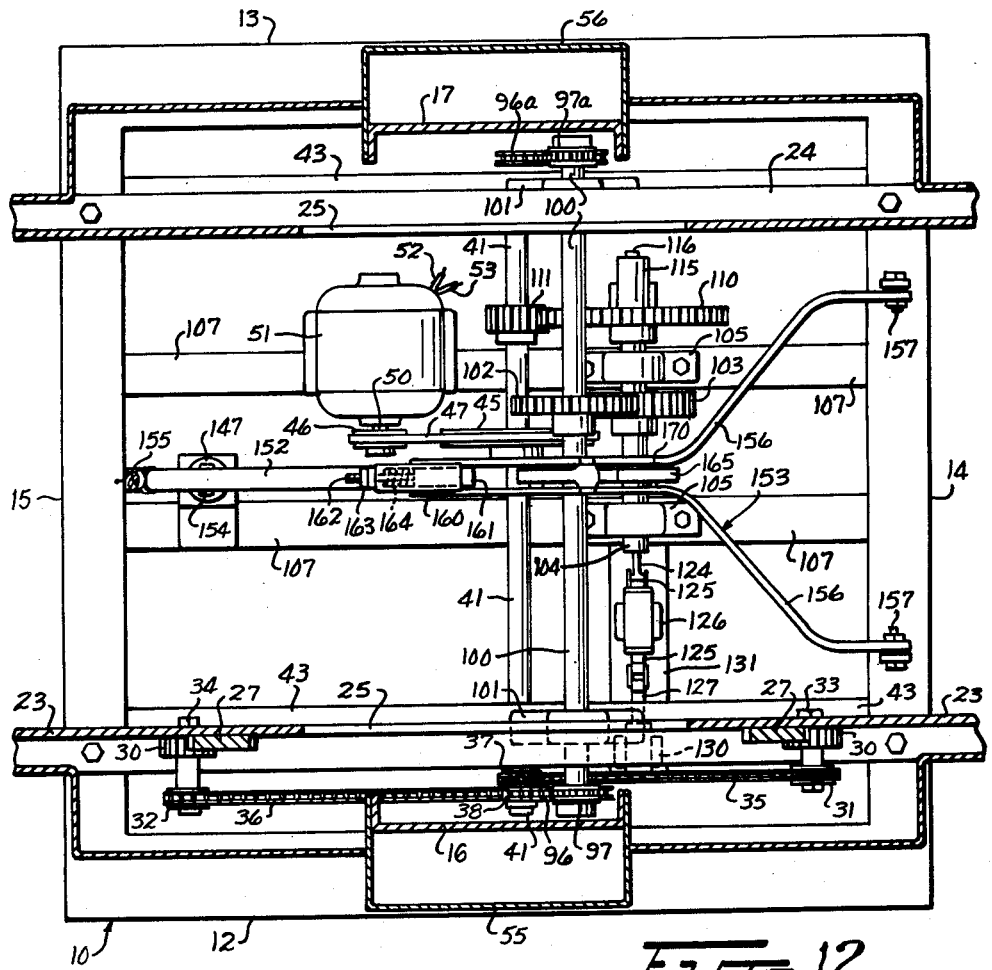
Figure 11:
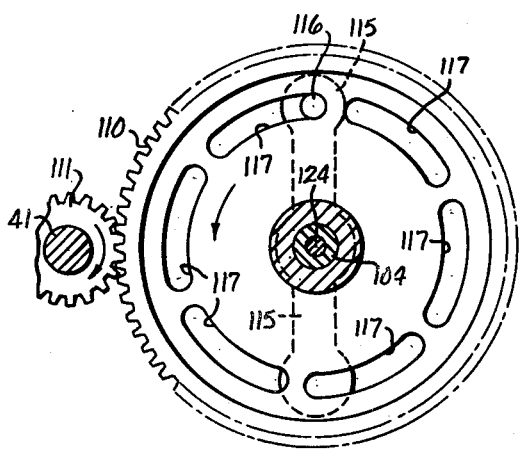

Figure 2–A is an enlarged fragmentary view of the end of the roll shown in the upper right-hand portion of Figure 2;

Figure 2–B is a plan view of the end of the roll taken susbtantially along the line 2–B—2–B in Figure 2–A;

Figure 3 is an enlarged vertical sectional view taken substantially along line 3—3 in Figure 2 showing a basket of fruit clamped between the gripping platforms preparatory to being inverted, and with some of the parts broken away for purposes of clarity;

Figure 4 is a fragmentary elevation, partially in section and partially broken away, showing the means responsive to tightening of the pliable element between the side members of the rotatable frame for actuating the electrical circuit of the device to effect converging movement to the platforms and to effect rotation of the rotatable frame, and being taken substantially along line 4—4 in Figure 3;

Figure 5 is a fragmentary elevation, partially broken away and partially in section, taken substantially along line 5—5 of Figure 3 and showing the braking device for frictionally restraining the rotatable platform from rotative movement until the article is tightly gripped between the gripping platforms;

Figure 6 is a longitudinal vertical sectional view through the machine taken substantially along line 6—6 in Figure 3, but wherein the article or basket is shown in phantom lines;

Figure 7 is a fragmentary elevation showing the connection between the pliable element engageable by each successive article and the shaft on which the cam is mounted for operating the switches interposed in the electrical circuit of the machine;

Figure 8 is a view similar to the central portion of Figure 6, but showing the rotatable platform and the article therein as though partially rotated in the course of inverting the article;

Figure 9 is an enlarged fragmentary vertical sectional view taken substantially along line 9—9 in Figure 6, showing the clutch mechanism in engaged position relative to the adjacent constantly driven element of the machine;

Figure 10 is a view similar to Figure 4, but showing the electrical switch operating means as though rotated one-half a revolution from the position shown in Figure 4;

Figure 11 is a fragmentary elevation, partially in section, taken substantially along line 11—11 in Figure 9;

Figure 12 is a sectional plan view taken substantially along line 12—12 in Figure 6;

Figure 13 is an enlarged fragmentary plan view taken substantially along line 13—13 in Figure 6;

Figure 14 is a schematic diagram of the electrical circuit for the machine.

Referring more specifically to the drawings, the numeral 10 broadly designates the main frame of the machine which is substantially rectangular in plan and is supported on legs 11. The frame 10 comprises spaced parallel longitudinally extending side frame members 12, 13 whose opposite ends are connected to front and rear transverse frame members 14, 15, all the frame members 12 to 15, inclusive, preferably being channel-shaped in cross section. Suitably secured to the proximal surfaces of the longitudinally extending side frame members 12, 13 are the lower portions of respective upright frame members 16, 17. Mounted upon the frame 10 are longitudinally spaced constantly driven ingress and egress or feed and discharge conveyors respectively generally designated at 20, 21. The lower portion of the improved article inverting device is disposed between the proximal portions of the ingress and egress conveyors 20, 21, and will be later described.

In this instance, the conveyors 20, 21 are shown as being of the roller type and each comprises a plurality of rollers 22 for conveying successive articles, baskets or packages A, only one of which is shown (Figures 3, 6 and 8), into and away from the article turning device. In this instance, reduced opposite ends of all the rollers 22 are suitably journaled in longitudinally extending conveyor frame members 23, 24 which are also shown in the form of channel bars and the medial portion of each of which is cut away to form an opening 25 to permit free rotative movement of the rotatable frame of the article inverting device to be later described.

As best shown in Figure 2, corresponding reduced ends of the conveyor rollers 22 have suitable gears 26 thereon which mesh with gears 27 rotatably mounted on the channel bar 23. The two innermost or centermost gears 27 each engages a corresponding gear 30 (Figure 12). The gears 30 have respective sprocket wheels 31, 32 integral therewith or suitably secured thereto and are mounted on respective stub shafts 33, 34.

The sprocket wheels 31, 32 are engaged by respective endless sprocket chains 35, 36 (Figure 2) which converge downwardly and are also mounted on respective sprocket wheels 37, 38 (Figure 3). The sprocket wheels 37, 38 are fixed on one end of a main drive shaft 41 journaled in spaced bearing blocks 42 carried by corresponding longitudinally extending frame members 43 shown in the form of angle bars in Figure 3. Opposite ends of the angle bars 43 are suitably secured to the transverse frame members 14, 15.

The main drive shaft 41 is constantly driven by means of a pair of pulleys 45, 46 (Figures 3 and 6) connected by a belt 47 and fixed on the shaft 41 and a motor shaft 50, respectively. The motor shaft 50 is driven by an electric motor 51 (Figure 12) having wires or conductors 52, 53 extending therefrom to a suitable source of electrical energy, not shown. A manually operable master switch 54 (Figure 1) may be interposed in one or both of the wires or conductors 52 for controlling the flow of current to the electric motor 51. The switch 54 is preferably mounted on the outer wall of an upright casing 55 supported on the central portion of the longitudinally extending side frame member 12 and on the upright frame member 16.

As a matter of fact, the upright frame member 16 forms the inner wall of the casing 55. A similar upright casing 56 is disposed at the side of the machine opposite from the casing 55 and the upright frame member 17 forms the inner wall of the casing 56. Suitable gear covers 57 are also provided between the flanges of the front and rear portions of the channel bar 23 for enclosing the gears 26, 27, 30 and the sprocket wheels 31, 32.

It is thus seen that, since the main drive shaft 41 is constantly driven during energization of the electric motor 51, the rollers 22 associated with the ingress and egress conveyors 20, 21 are continuously driven to impart forward movement to any articles positioned thereupon.

Since the present invention is particularly devised for turning or inverting fruit baskets during the packing operation, each successive article or basket A is positioned upon a novel form of adapter so the fruit, produce or other commodity positioned in the basket or article A may collectively form a substantially convex surface. As is well known in the art, most produce or fruit baskets are frusto-conical in shape and have a flat bottom and a concavo-convex top and, in order that the produce or fruit in each basket may form a substantially convex surface at the bottom of the contents of each basket before each basket is inverted, a layer of peaches or other fruit or produce designated at P is positioned upon a cushion disk 60 which, in turn, rests upon or is adhesively secured to the convex upper surface of a wall member 61 of an adapter broadly designated at 62.

The adapter 62 has an annular wall 63 projecting upwardly from and encircling the concave bottom wall 61 of the adapter 62 and the adapter 62, which is also substantially circular in plan, is provided with a peripheral flange 64 intermediate its upper and lower edges. It might be stated that, after the bottom layer of fruit or produce P has been carefully arranged upon the resilient member 60, it is the usual practice to place a substantially frusto-conical paper or fibrous liner 65 with its large end about the wall 63 and resting upon the flange 64. A metal or rigid frusto-conical member, not shown, having substantially the same shape as the basket A is then positioned about the liner 65 to prevent the same from collapsing and, thereafter, the liner is filled with the fruit or produce P.

After the liner 65 has been filled with produce or fruit P, the said reinforcing member is removed and a basket A is substituted therefor as shown in Figure 3. Since the annular wall of the adapter 62 extends downwardly beyond the lower surface of the bottom wall 61 of the adapter 62, the lower edge of the wall of each successive adapter 62 rests upon the rollers 22 as each successive article A is fed into and carried away from the improved article inverting and turning device. Thus, each successive article will not only remain upright during its movement through the machine, but the improved adapter 62 in conjunction with the improved article inverting or turning device facilitates filling the baskets A before they are inverted and before applying a cover to each successive article.

As a matter of fact, the present article turning or inverting apparatus is particularly devised for inverting each successive basket A since they are originally filled with their large open ends facing downwardly and it is necessary that the article be inverted in order to apply suitable covers to the large open ends of the articles A.

Another method of packing peaches and other fruit is to place an inverted lid on a suitable support and place a circular sheet of paper on the upper or inner side of the lid, then place a larger end of a liner inside the rim of the lid, and then pack the fruit into the liner, then place an inverted basket over the liner with the fruit therein so that the open end of the basket will fit inside of the rim of the lid. The lid is then secured to the basket and then the basket is inverted. The present apparatus can be employed for packing fruit in this manner and, in which case, a suitable support, such as shown by reference characters 61, 63, and 64, would be provided with the uprising portion 63 omitted, but the top of the lid carrying member will be shaped to fit the top surface of the lid, and the lid could be placed in position on this member 62 and the liner placed thereon with a resilient disk of paper on the inside of the lid. With the fruit then packed in the liner, the basket could be then inverted and placed over the liner and secured to the lid, after which it can be fed to the turning device shown and may be operated equally as well with this method of packing as with the specially shaped member 62, which provides for the lid being placed on the basket after it is inverted.

*Article turning or inverting device*

The article turning device comprises a substantially rectangular frame broadly designated at 70 which is normally disposed in a vertical position and is mounted for rotation about a horizontal axis spaced above the horizontal plane of the ingress and egress conveyors 20, 21 and disposed between the proximal portions of said conveyors 20, 21. The substantially rectangular frame 70 comprises normally vertically spaced cross frame members 71, 72, whose opposite ends are connected to opposite ends of side frame members which serve as guides for a pair of spaced radially movable gripping or clamping platforms broadly designated at 75, 76, respectively. The platforms 75, 76 comprise respective rows of idler rollers 77, 78 whose reduced opposite ends are journaled in bars or plates 81, 82 and 83, 84 and the rearmost of each of which, when in lowered position, is provided with means to prevent reverse rotation thereof, in order to prevent reverse movement of each successive article A as it is fed onto the corresponding lowered platform 75 or 76 by the feed conveyor 20. The means for preventing reverse rotation of these rollers comprises a ratchet 79 fixed on one of the reduced ends of each of the rearmost rolls 77 and 78 when in lowered position (Figures 1, 2–A and 2–B). The ratchets 79 are each engaged and prevented from reverse rotation by the free end of a leaf spring member 79a the other end of which is fixed to the bars 81 and 83. Opposite ends of cross bars 81a, 83a are also fixed to the respective longitudinal bars 81, 82 and 83, 84.

The medial portions of the bars 81 to 84, inclusive, are fixed to respective guide blocks 85 to 88, inclusive, mounted for longitudinal sliding movement on the corresponding side frame members 73, 74 of the rotatable frame 70. The medial portions of the side frame members 73, 74 of the rotatable frame 70 have respective journal portions or stub shafts 91, 92 projecting outwardly therefrom (Figure 3) which are suitably journaled in the upright frame members 16, 17 of the main frame 10.

Loosely mounted on the shafts 91, 92 are respective disk-like members in the form of sprocket wheels 93, 93a which have the proximal ends of respective pairs of parallel links 94, 95 and 94a, 95a pivotally connected thereto in diametrically opposed spaced relationship. The distal ends of the parallel links 94, 95, 94a, 95a are pivotally connected to the respective guide blocks 85 to 88, inclusive (Figures 2, 3, 6 and 13). The sprocket wheels 93, 93a have respective endless sprocket chains 96, 96a mounted thereon whose lower portions are mounted on respective sprocket wheels 97, 97a. The sprocket wheels 97, 97a are fixed on opposite ends of a transverse shaft 100 journaled in bearing blocks 101 fixed to the upper surfaces of the respective longitudinally extending frame members 43.

The shaft 100 has a gear 102 fixed thereon which meshes with a gear 103 fixed on a transverse jack shaft 104. The jacket shaft 104 is journaled in bearing blocks 105 mounted on respective spaced longitudinally extending frame members 107 spaced below the level of and inwardly of the frame members 43 and connected at opposite ends thereof to the transverse frame members 14, 15 of the main frame 10.

The shaft 104 also has a gear 110 loosely mounted thereon which meshes with a pinion or gear 111 fixed on the main drive shaft 41. Thus, when the electric motor 51 is energized, the gear 110 is driven constantly and may be termed as the constantly driven element of a clutch mechanism which will now be described.

The clutch mechanism also comprises a hub member 115 fixed on one end of the shaft 104 and which has an off-set axially movable clutch pin 116 mounted therein. Pin 116 is adapted to, at times, engage any one of a plurality of circularly arranged arcuate slots or grooves 117 formed in the gear 110. The outer portion of the clutch pin 116 has a transverse tapered bore 120 therein which is loosely engaged by one end of a shifting lever or yoke 121 pivotally mounted, as at 122, in a bifurcated portion of the hub member 115. The forked or bifurcated lower end of the shifting lever 121 engages in a groove 123 on on the corresponding end of a shifting rod 124. The shifting rod 124 is mounted for axial sliding movement in the shaft 104 and is loosely mounted therein and projects outwardly beyond opposite ends thereof.

The end of the shifting rod or shaft 124 remote from the yoke 121 is connected to one end of a solenoid plunger 125 whose medial portion is surrounded by a solenoid coil 126. (Figures 3, 12 and 14.) The other end of the solenoid plunger 125 is coupled to the proximal end of a second solenoid plunger 127 whose medial portion is surrounded by a second solenoid coil 130.

The housings for the solenoid coils 126, 130 and the respective plungers 125, 127 are fixed to an angle plate 131 (Figures 3 and 12) whose vertical leg is suitably secured to one of the longitudinally extending frame members 107. Opposite ends of the solenoid coils 126, 130 (Figure 14) have respective pairs of wires or conductors 132, 133 and 134, 135 connected thereto. The end of wire 135 remote from the coil 130 is connected intermediate the ends of the wire 133 and the end of wire 133 remote from the solenoid coil 126 is connected intermediate the ends of a wire or conductor 136. Corresponding ends of the wire 136 and a wire or conductor 137 are connected to opposite sides of a secondary coil of a transformer 140, to opposite ends of the primary coil of which wires or conductors 141, 142 are connected. The other ends of the wires 141, 142 are connected to a plug 143 adapted to be connected to a suitable source of electrical energy, not shown.

The end of wire 137 remote from the transformer 140 is connected to one side of a switch 144, to the other side of which a wire or conductor 145 is connected. Corresponding ends of the wires 145, 136 are connected to opposite sides of a solenoid coil 147 which surrounds the medial portion of a solenoid plunger 150. The coil 147 and plunger 150 are parts of a latching or rotatable frame restraining mechanism which will now be described in detail.

As best shown in Figures 6, 8 and 12, it will be observed that the coil 147 and plunger 150 are mounted in a suitable housing 151 suitably supported by one of the longitudinally extending frame members 107. The upper end of the solenoid plunger 150 is connected to the downwardly and rearwardly inclined free end portion 152 of a composite lever 153 by means of links 154. The composite lever 153 is normally resiliently urged upwardly by a tension spring 155.

It will be noted that the portion 152 of the composite lever 153 is in the form of a bar which extends upwardly and forwardly at an angle and is positioned between the front ends of a pair of arms 156 which are also parts of the composite link 153. These arms 156 extend forwardly and then diverge from each other and are bent forwardly (Figure 12) and are pivotally connected, as at 157, to the upper portion of the front transverse frame member 14. The bar 152 has a housing 160 fixed thereon which carries a resilient bumper 161 which is preferably spring loaded as shown in Figure 12.

It will be observed in Figure 12 that the bumper 161 is mounted for longitudinal movement in the housing 160 and has a reduced threaded portion 162 thereon which is engaged by nuts 163 for limiting forward movement of the bumper 161. The bumper 161 is normally urged forwardly by means of a compression spring 164 disposed within the housing 160.

Spaced forwardly from the bumper 161 is a latch lever 165 which is pivoted at 166 between the rear portions of the arms 156 of the composite lever 153. A spring 167 normally urges the rear portion of the latch lever 165 upwardly or away from the composite lever 153 and this upward movement of the rear portion of the lever 165 is restricted by an abutment 170 engaging the lower surface of the front portion of the latch lever 165 and which abutment is suitably supported on the arms 156 of the composite lever 153. The purpose of the latching or restraining device, of which the composite lever 153, bumper 161 and latch lever 165 are parts, will be later described.

Referring again to Figure 14, the ends of the wires or conductors 132, 134, remote from the respective solenoid coils 126, 130 are connected to spaced contacts on one side of a double-throw switch 172, to the other side of which one end of a wire or conductor 173 is connected. The other end of the wire 173 is connected intermediate the ends of the wire 137.

It will be observed in Figures 4 and 10 that the housings for the switches 144, 172 are suitably secured to the outer surface of the upright frame member 16 of the main frame 10 and the switches 144, 172 have respective arms 175, 176 extending upwardly therefrom in whose free ends respective rollers or followers 177, 178 are mounted. The rollers 177, 178 are normally urged against the periphery of a cam wheel 181 by springs 179 shown schematically in Figure 14. The cam wheel 181 is substantially circular and is provided with a pair of diametrically opposed notches or recesses 182, 183 which are adapted to be alternately engaged by the rollers or followers 177, 178.

The cam wheel 181 is fixed on the outer end of the stub shaft 91, which projects outwardly from the rotatable frame 70, and the outer surface of the cam 181 is loosely engaged by another cam 185 having substantially diametrically opposed high points which are also adapted to alternately engage the rollers or followers 177, 178. The cam 185 is shown in the form of a bar whose medial portion is fixed on a switch actuating shaft 186 (Figures 3, 4, 10 and 14) which loosely axially penetrates the shaft 91 as well as the side frame member 73 of the rotatable frame 70. The inner end of the shaft 186 has a radially extending arm or crank 187 fixed thereon, to the free end of which one end of a pliable element, such as a cable or cord 190, is suitably secured (Figure 7).

The pliable element 190 is normally relatively slack and its other end is connected to the side frame member 74 (Figures 1, 3, 6 and 8). Thus, as each successive article A is moved onto the then lowermost platform 75 or 76, as the case may be, the article engages and takes up the slack in the cable or pliable element 190 to thereby impart movement to the crank arm 187 on the switch actuating shaft 186. The crank arm 187 is limited as to rotative movement relative to the rotatable frame 70 by means of a substantially U-shaped restricting member 192 suitably secured to the inner surface of the side frame member 73 of the rotatable frame 70, as best shown in Figures 3 and 7.

In order to provide frictional resistance to rotative movement of the rotatable frame 70, a suitable friction means or braking means is provided which is shown in the form of a brake drum or grooved pulley 195 (Figures 3 and 5) fixed on the outer end of the journal portion or the stub shaft 92, whose inner end is connected to the side frame member 74 of the rotatable frame 70. The periphery of the brake drum 195 is engaged by a friction lining or brake lining 196 which is suitably secured to a pair of substantially semi-circular brake bands 197, 198 (Figures 3 and 5). Corresponding ends of the brake bands 197, 198 are pivotally mounted on a stud 201 projecting outwardly from the upright frame member 17 of the main frame 10. The other ends of the brake bands 197, 198 project outwardly and are loosely penetrated by a bolt 202 which is surrounded by a compression spring 203 for urging the brake bands 197, 198 toward each other and thus resiliently urging the brake lining 196 against the periphery of the brake drum 195. The bolt 202 is provided to facilitate adjustment of the amount of pressure exerted by the brake lining 196 against the periphery of the brake drum 195.

Method of operation

As heretofore stated, the baskets of fruit or other produce are positioned upon the adapters 62 and the adapters 62 with the articles A thereon are positioned upon the feed conveyor 20 for successively feeding the articles A into the article turning device 70. As each successive article A is directed to the article turning device, the follower 178 is disposed in one of the notches 182 or 183, depending upon which of the platforms 75 or 76 is in the lower position relative to the other while the follower 177 is engaged by the outer cam 185 and is thereby held out of the other of the notches in the periphery of the cam 181. By referring to Figure 14, it is apparent that the switch 144 would then be open while switch 172 is making the circuit between wires 173, 134.

Thus, although the gear 110 (Figures 3, 6, 8, 9, 11 and 12) is constantly driven, the solenoid coil 130 (Figures 3, 12 and 14) is energized while the coil 126 is de-energized thereby urging the shifting shaft 124 to the right in Figures 9 and 14 and urging the clutch pin 116 to the left in Figures 9 and 14. Thus, the shaft 104 is stationary as each successive article is directed onto the then lowermost of the platforms 75, 76 and, since there is no rotative force then applied to the disk-like elements or sprocket wheels 93, 93a, the gripping platforms 75, 76 are spaced further apart from each other than illustrated in Figures 3, 6 and 8 so the upper surfaces of the rollers of the then lowermost platform are disposed in substantially the same horizontal plane as the upper surfaces of the rollers 22 of the feed and discharge conveyors 20, 21.

For purposes of further description, it shall be assumed that the platform 75 is initially in the lowermost position as compared to the platform 76. Referring again to Figure 14, it will be observed that when the cam 185 is in engagement with the follower 177, the switch 144 is open and the solenoid coil 147 is de-energized thus permitting the spring 155 to urge the composite lever 153 upwardly to substantially the position shown in Figure 8 so the cross bar 72 of the rotatable frame 70 is then disposed between the bumper 161 and the rear end of the latch lever 165. It is apparent that this restrains the rotatable frame 70 and its platforms 75, 76 from rotative movement.

Now, as alternate articles are directed onto the rollers 77 of the then lowermost gripping platform 75 by the feed conveyor 20, the successive alternate articles each engages the cord or pliable element 190, drawing the same taut substantially as the vertical axis of the article approaches the horizontal plane of the axis of the rotatable frame 70 (see Figure 6). The articles A are restrained from rearward movement as they engage the cord 190 by the ratchet wheels 70 in the rearmost lowered roll 77. As the pliable element 190 is drawn taut, the crank arm 187 (Figures 3, 4 and 10) is moved forwardly therewith from one of the legs of said restricting member 192 against the other of the legs of the restricting member thereby moving the cam 185 to substantially the position shown in Figure 4. It is apparent that this permits the switch 144 to close and breaks contact between the wires 173, 134 (Figure 14) while effecting contact between wires 173, 132.

This simultaneously energizes the solenoid coils 126, 147 and de-energizes the solenoid coil 130. With energization of coil 147, it is apparent that the composite lever 153 is moved downwardly from the position shown in Figure 8 to substantially the position shown in Figure 6 so the bumper 161 and the latch lever 165 are disposed clear of the rotatable frame 70. Also, energization of solenoid coil 126 causes the shifting rod or shaft 124 to move from right to left to the position shown in Figures 9 and 14 so the clutch pin 116 enters one of the arcuate slots 117 in the gear 110 and, when the trailing wall of the corresponding slot 117 engages the pin 116 it is apparent that rotation is then imparted to the sprocket wheels or disk-like elements 93, 93a.

Although the rotatable frame 70 is then free of the latching mechanism including elements 161, 165, the brake mechanism shown in Figures 3 and 5 resists rotative movement of the rotatable frame 70 so that, upon rotation initially being imparted to the sprocket wheels 93, 93a, they cause the platforms 75, 76 to move toward each other, through the intervening links 94, 95 and 94a, 95a, to grip the article A therebetween. When the gripping pressure of the gripping platform 75, 76 is equal to the inertia of the braking means, the rotative force of the sprocket wheels 93, 93a is transmitted to the rotatable frame 70. This causes the rotatable frame 70 to rotate with the sprocket wheels 93, 93a for inverting the article A then clamped between the gripping platforms 75, 76.

It will be noted that, shortly after rotation of the rotatable frame 70 has commenced, the notch 182 (Figure 4) moves out of engagement with the follower 177 to open switch 144, thereby breaking the circuit to the solenoid coil 147. Thus, during the course of rotation of the rotatable frame 70, the spring 155 returns the composite lever 153 to the position shown in Figure 8 so that the bumper 161 is subsequently engaged by and prevents further rotational movement of the rotatable frame 70. It should be noted that as the transverse frame member 71 of the rotatable frame 70 approaches the bumper 161, it engages and depresses the latch lever 165 which subsequently snaps upwardly as the transverse frame member 71 engages the bumper 161 so the frame member 71 is then restrained from movement in either direction by the bumper 161 and the latch lever 165.

As the frame member 71 engages the bumper 161, the cams 181, 185 occupy the position shown in Figure 10 which is diametrically opposite from the position occupied thereby in Figure 4. In so doing, the follower 177 is engaged by the bar cam 185 and prevents the follower 177 from dropping into the notch 183. On the other hand, the follower 178 then drops into the notch 182 in cam 181 thus moving the switch 172 to break the circuit to the clutch-engaging solenoid coil 126 while closing the circuit to the clutch-disengaging solenoid coil 130.

It follows that, when the transverse frame member 71 of the rotatable frame 70 engages the bumper 161, the clutch pin 116 is withdrawn from the corresponding groove 117 in the constantly driven gear 110 so the hub member 115 is free of the gear 110 and may remain stationary or rotate independently of the gear 110.

It is apparent that, since the rotatable frame 70 is restrained from rotation by the bumper 161 and the latch lever 165, the sprocket wheels 93, 93a are then prevented from continuing rotation in the same direction they rotated during the inverting of the article A. However, the hub 115 being free of the gear 110, intervening connections between and including the hub 115 and the sprocket wheels 93, 93a are free to rotate in the opposite direction from that in which they rotated during the inverting of the article A. Consequently, the weight of the article upon the then lowermost gripping platform 76 will cause the same to move downwardly to the level of the ingress and egress conveyors 20, 21 while turning the sprocket wheels 93, 93a in the reverse direction and thereby causing the other or then upper platform 75 to move upwardly to release the article from between the gripping platforms 75, 76.

Since the ingress conveyor 20 is constantly driven, the next succeeding article will then engage and move the immediately previously inverted article off of the then lowermost platform 76, whereupon the inverted article is discharged on the discharge conveyor 21. It will be noted that as the article is inverted in the manner heretofore described, upon inversion thereof the pliable element 190 is then in engagement with the trailing portion of the wall of the article A so that it will not interfere with the ejection of the inverted article from between the platforms 75, 76.

Also, the pliable element is then so positioned as to be engaged by the next succeeding article as it is positioned upon the then lowermost platform 76. The operation of the article inverting device 70 is substantially the same regardless of which of the platforms 75, 76 happen to be in lowered position. Of course, when the platform 76 is in lowered position, the cams 181, 185 then occupy the position shown in Figure 10 so that, as the pliable element 190 is drawn taut by the next succeeding article, it will move the cam 185 in a clockwise direction in Figure 10, permitting the follower 177 to fall into notch 183 and moving the follower 178 out of the notch 182 in the cam 181. This completes the circuit to the solenoid coil 130 while breaking the circuit to the solenoid coil 126 and also completes the circuit to the solenoid coil 147 to initiate rotation of the rotatable frame 70 and the gripping platforms 75, 76 in exactly the manner heretofore described.

When the rotatable frame 70 again returns to the position shown in Figure 6, the circuit to the solenoid coil 147 will have again been broken in the manner heretofore described and, although the notches 182, 183 then register with the respective followers or rollers 177, 178, the cam 185, which was previously rotated by the tightening of the pliable element 190 when the platform 76 occupied the lowermost position, will then be in position to prevent the follower 177 from dropping into notch 182, although the follower 178 may then drop into the notch 183. This positions the various operating parts of the machine for another cycle in operation with the platform 75 then again in the lowermost position relative to platform 76.

It is thus seen that I have provided a novel article turning or inverting apparatus having relatively movable platforms which will clamp or grip articles of varying height under uniform pressure and then rotate the platforms exactly one-half a revolution and then release the article therefrom and wherein the means for effecting these three primary operations in sequence are such that the entire sequence of operations is smooth and uninterrupted so the article turning device may be operated at relatively high speed without damaging the articles or the contents thereof. After each successive article has been inverted and moved onto the discharge conveyor 21, it is merely necessary to remove the adapter 62 and then position the usual type of concavo-convex cover on the article. The adapter may then be used for supporting another article as it is fed into the article turning device 70 by the feed conveyor 20.

Although article turning or inverting devices have been used heretofore, it has been necessary for the operator to place each successive article within such turning devices manually; they have not operated as smoothly as the present device and could not clamp articles of varying lengths or heights therein during the turning operation without making considerable complex adjustments in the gripping platforms. To my knowledge, no prior devices of this character have been provided which were capable of successively receiving articles one after another and automatically inverting the articles, merely as a result of each successive article being fed into the article turning device, and thereafter automatically ejecting or releasing the articles from the article turning device.

In the drawings and specification there has been set forth a preferred embodiment of the invention and, although specific terms are employed, they are used in a generic and descriptive sense only and not for purposes of limitation, the scope of the invention being defined in the claims.

I claim:

1. An article inverting apparatus comprising a rotatable frame mounted on a substantially horizontal axis, inwardly and outwardly movable article gripping platforms within the rotatable frame, means engageable by each successive article as it is positioned upon the then lowermost gripping platform for gripping the article therebetween, means responsive to engagement of the platforms with opposite ends of the article for imparting substantially a half a revolution to the rotatable frame, and means solely under control of the article thus inverted for imparting relative outward movement to said gripping platforms whereby the article thus inverted may be removed from the then lowermost gripping platform.

2. An article turning device comprising a support, a rotatable frame mounted in the support, means for rotating the frame, inwardly and outwardly movable article gripping frames within the rotatable frame adapted to alternately receive articles thereon, means responsive to each successive article being positioned upon the then lowermost gripping frame for imparting inward movement to both of said gripping frames for gripping each successive article therebetween, means responsive to engagement of said gripping frames with opposite ends of an article for imparting substantially a half a revolution to said rotatable frame, means operable automatically for stopping rotation of the rotatable frame upon substantially a half a revolution being imparted thereto, and means solely under the control of the article thus inverted for moving said gripping frames apart from each other.

3. The combination with an article turning machine having a rotatable frame, of article gripping frames mounted for relative movement in the rotatable frame and adapted to grip opposite ends of an article, links carried by the gripping frames and extending inwardly, a rotatable element mounted axially with respect to the rotatable frame for movement relative to the rotatable frame and to substantially diametrically opposed points of which the proximal ends of said links are connected, friction means normally restraining rotation of said rotatable frame, and means under control of the article for effecting rotation of said rotatable element whereby said rotatable element will initially cause inward movement of said links and said gripping frames until the inertia of said friction means is overcome and whereupon the rotatable element will then impart rotation to the rotatable frame for inverting the article.

4. An article turning device comprising a support, a rotatable frame within said support, latch means normally maintaining said frame in a substantially vertical plane for receiving therein an article to be inverted, gripping means movably mounted in the ends of the rotatable frame, means under control of the article for releasing the frame from the latch means and for moving the gripping means inwardly for engaging opposite ends of the article under predetermined pressure, said means for moving the gripping means inwardly being operable to rotate said rotatable frame, means operable automatically upon predetermined rotative movement being imparted to said rotatable frame for releasing the pressure from said gripping means, and said latch means being operable to restrain said frame from further movement upon termination of said predetermined rotative movement.

5. An article turning device comprising a support, a rotatable frame within said support, said frame normally being in a substantially vertical plane and adapted to receive therein an article to be inverted, gripping means slidably mounted in the ends of the rotatable frame, means under control of the article for moving the gripping means inwardly for engaging opposite ends of the article under predetermined pressure when said rotatable frame is in substantially vertical position, said means for moving the gripping means inwardly under predetermined pressure being operable to rotate said rotatable frame upon said predetermined pressure being applied against opposite ends of the article by the gripping means, and means operable automatically upon predetermined rotative movement being imparted to said rotatable frame for releasing the pressure from said gripping means.

6. An article inverting apparatus comprising a rotatable frame mounted on a substantially horizontal axis, inwardly and outwardly movable article gripping frames within the rotatable frame, a row of transverse idle rollers on each gripping frame, means to permit rotation of at least one of the rollers on each gripping frame in one direction only, means engageable by each successive article as it is positioned upon the rollers of the then lowermost gripping frame for imparting relative inward movement to sad gripping frames for gripping each successive article between the rollers thereon, means responsive to engagement of the rollers with opposite ends of an article for imparting substantially a half a revolution to the rotatable frame, and means solely under control of the article thus inverted for imparting relative outward movement to said gripping frames whereby the article thus inverted may be removed from the rollers on the then lowermost gripping frame.

7. An article inverting apparatus comprising longitudinally spaced constantly driven feed and discharge conveyors, a rotatable frame mounted on a transverse axis on a plane above and between said conveyors, inwardly and outwardly movable article gripping frames within the rotatable frame, a row of transverse idle rollers on each gripping frame, means to prevent reverse rotation of at least one of the rollers on each gripping frame, means engageable by each successive article as it is fed onto the rollers of the then lowermost gripping frame for imparting relative inward movement to said gripping frames for gripping each successive article between the rollers thereon, means responsive to engagement of the rollers with opposite ends of an article for imparting substantially a half a revolution to the rotatable frame, and means solely under control of the article thus inverted for imparting relative outward movement to said gripping frames whereby the next succeeding article will push the article thus inverted off the rollers on the then lowermost gripping frame onto said discharge conveyor.

8. The combination with an article turning machine having a rotatable frame, of article gripping platforms mounted for relative movement in the rotatable frame, each platform comprising a row of idle rollers, said rows of rollers being adapted to engage opposite ends of an article, means to prevent rotation of at least one of the rollers in each platform in but one direction, links carried by the gripping frames and extending inwardly, a rotatable element mounted axially with respect to the rotatable frame but for movement relative to the rotatable frame and to substantially diametrically opposed points of which the proximal ends of said links are connected, friction means normally restraining rotation of said rotatable frame, and means under control of the article for effecting rotation of said rotatable element whereby said rotatable element will initially cause inward movement of said links and said gripping platforms until the inertia of said friction means is overcome and whereupon the rotatable element will then impart rotation to the rotatable frame for inverting the article.

9. An article turning device comprising a support, a rotatable frame mounted in the support, means for rotating the frame, inwardly and outwardly movable article gripping frames within the rotatable frame, means for feeding articles, one at a time, onto the then lowermost of said gripping frames, means responsive to each successive article being positioned upon the then lowermost gripping frame for imparting inward movement to both of said gripping frames for gripping each successive article therebetween, means responsive to inward movement of said gripping frames against an article under predetermined pressure for imparting substantially a half a revolution to said rotatable frame, means operable automatically for stopping rotation of the rotatable frame upon substantially a half a revolution being imparted thereto and being operable automatically to move said gripping frames apart from each other, and a constantly driven discharge conveyor disposed adjacent the side of the rotatable frame remote from the means for feeding said articles whereby the next succeeding article will move the article so turned on the rotatable frame onto the discharge conveyor to be discharged thereby as a succeeding article is turned.

10. An article turning machine comprising a support, a substantially rectangular frame rotatably mounted in said support on a substantially horizontal axis, first and second opposed gripping frames mounted for relative movement in the ends of the rectangular frame, means cooperating with the article gripping frames and controlled by engagement with an article for imparting inward movement to the gripping frames for gripping the article therebetween, latching means carried by said support and normally maintaining the rectangular frame in a substantially vertical position, said means controlled by engagement with the article being operable to momentarily release the rectangular frame from said latching means, means for rotating the rectangular frame, means responsive to movement of the gripping frames into engagement with opposite ends of said article for actuating the rotating means, means operable automatically upon substantially one-half a revolution being imparted to said rectangular frame for de-activating said rotating means and for releasing said gripping frames, and means interconnecting said gripping frames and being so arranged that, when released, the then lower gripping frame will move downwardly under the weight of the article and the then upper gripping frame will move upwardly away from the then upper end of the article.

11. An article inverting device comprising a support, a rotatable frame mounted in the support, means for rotating the frame, latch means normally holding said frame in substantially vertical position, inwardly and outwardly movable article gripping frames within the rotatable frame, means for feeding the articles, one at a time, onto the then lowermost of said gripping frames, means responsive to each successive article being positioned upon the then lowermost gripping frame for releasing the frame from said latch means and for imparting inward movement to both of said gripping frames for gripping each successive article therebetween, means responsive to engagement of said gripping frames with opposite ends of an article for imparting substantially a half a revolution to said rotatable frame, means operable automatically for stopping rotation of the rotatable frame upon substantially a half a revolution being imparted thereto, means solely under the control of the article thus inverted to permit movement of said gripping frames apart from each other, said latch means being operable to again hold said frame at the end of each substantially half revolution thereof, and a constantly driven discharge conveyor disposed adjacent the side of the rotatable frame remote from the means for feeding said articles whereby the next succeeding article will move the article so inverted off the then lowermost gripping frame onto the discharge conveyor to be discharged thereby as a succeeding article is inverted.

12. An article turning device comprising a main frame, a substantially rectangular rotatable frame having spaced parallel cross bars and spaced substantially parallel side bars, journal shafts extending outwardly from the side bars of the rotatable frame and journaled in said main frame, a disk-like member rotatably mounted on at least one each of said journal shafts, said rotatable frame having at its ends inwardly and outwardly movable article gripping members, a pair of links having corresponding ends connected to substantially diametrically opposed points on said disk-like member and extending outwardly therefrom, the distal ends of said links being pivotally connected to said gripping members, a friction device normally resisting the rotatable frame against rotation under predetermined pressure, a constantly driven rotary element, a clutch mechanism disposed adjacent the rotary element, a driving connection between the clutch element and said disk-like member, means controlled by engagement with an article for engaging said clutch mechanism with the rotary element to thereby impart rotation to the disk-like member whereby said disk-like member will rotate on the corresponding journal shaft for moving the gripping members inwardly and, when the gripping members have engaged the article under predetermined pressure sufficient to overcome the inertia of the friction device, rotation is then imparted to the rotatable frame through the links and the disk-like member, and means operable automatically upon substantially one-half a revolution being imparted to the rotatable frame for disengaging the clutch mechanism so the weight of the article against one of the gripping members will impart downward movement thereto, causing the two gripping members to move apart from each other for releasing the article therefrom.

13. An article turning device comprising a main frame, constantly driven ingress and egress conveyors carried by the main frame, a substantially rectangular rotatable frame having spaced parallel cross bars and spaced substantially parallel side bars disposed between said conveyors, journal shafts extending outwardly from the side bars of the rotatable frame and being journaled in said main frame, a disk-like member rotatably mounted on each of said journal shafts, said rotatable frame having at its ends inwardly and outwardly movable article gripping members, a pair of links having corresponding ends connected to substantially diametrically opposed points on each of said disk-like members and extending outwardly therefrom, the distal ends of said links being pivotally connected to the respective gripping members, a friction device normally resisting the rotatable frame against rotation under predetermined pressure, a constantly driven rotary element, a clutch mechanism disposed adjacent the rotary element, a driving connection between the clutch mechanism and said disk-like members, means controlled by engagement with an article for engaging said clutch mechanism with the rotary element to thereby impart rotation to the disk-like members whereby said disk-like members will rotate on the respective journal shafts for moving the gripping members inwardly and, when the gripping members have engaged the article under predetermined pressure sufficient to overcome the inertia of the friction device, rotation is then imparted to the rotatable frame through the links and the disk-like members, and means operable automatically upon substantially one-half a revolution being imparted to the rotatable frame for disengaging the clutch mechanism so the weight of the article against one of the gripping members will impart downward movement thereto, causing the two gripping members to move apart from each other for releasing the article therefrom.

14. In a structure according to claim 13, said means controlled by engagement with an article comprising a pliable element having one of its ends connected to one of said side bars of the rotatable frame, a cam shaft axially journaled in the journal shaft extending outwardly from the other of the side bars and having a crank on its inner end to which the other end of said pliable element is connected, a first cam fixed on the outer end of the last-named journal shaft and having a pair of substantially diametrically opposed notches therein, a second cam fixed on the outer end of the cam shaft and having portions thereon adapted to alternately close said notches in the first cam, a double throw switch having a follower thereon adapted to alternately register with said notches in the first cam whereby said follower is normally in engagement with a corresponding notch in the first cam when the rotatable frame is stationary, first and second electrically operable means for respectively actuating and de-actuating said clutch mechanism and being interposed in an electrical circuit to the switch whereby, movement of an article into engagement with the pliable element will move said crank, cam shaft and second cam relative to the first cam so as to move the follower out of the corresponding notch to thereby energize the first electrically operable means for actuating the clutch mechanism, and upon substantially a half a revolution being imparted to said rotatable frame, the follower will drop into the other of said notches in the first cam to break the circuit to the first electrically operable means and to close the circuit to the second electrically operable means for de-actuating said clutch mechanism.

References Cited in the file of this patent
UNITED STATES PATENTS

| | | |
|---|---|---|
| 2,125,548 | Cowl | Aug. 2, 1938 |
| 2,293,192 | Campbell | Aug. 18, 1942 |
| 2,316,407 | Cowl | Apr. 13, 1943 |
| 2,520,252 | Mutchler | Aug. 29, 1950 |